US008012897B2

(12) United States Patent
Cohen

(10) Patent No.: US 8,012,897 B2
(45) Date of Patent: Sep. 6, 2011

(54) ALUMINA CERAMIC PRODUCTS

(76) Inventor: Michael Cohen, Mobile Post North Yehuda (IL)

( * ) Notice: Subject to any disclaimer, the term of this patent is extended or adjusted under 35 U.S.C. 154(b) by 0 days.

(21) Appl. No.: 12/396,381

(22) Filed: Mar. 2, 2009

(65) Prior Publication Data

US 2009/0163346 A1    Jun. 25, 2009

Related U.S. Application Data

(63) Continuation of application No. 11/215,183, filed on Aug. 29, 2005, now abandoned.

(30) Foreign Application Priority Data

Sep. 18, 2004 (IL) .......................... 164054

(51) Int. Cl.
C04B 35/119 (2006.01)
F41H 5/00 (2006.01)
(52) U.S. Cl. ............. 501/105; 501/127; 89/36.02; 2/2.5

(58) Field of Classification Search .................. 501/105, 501/127; 2/2.5; 89/36.02
See application file for complete search history.

(56) References Cited

U.S. PATENT DOCUMENTS

| 4,316,964 A * | 2/1982 | Lange ............................. 501/105 |
| 4,429,051 A * | 1/1984 | Davidge et al. ................. 501/12 |
| 6,624,106 B2 * | 9/2003 | Cohen ............................. 501/105 |
| 7,148,167 B2 * | 12/2006 | Shikata et al. ................. 501/105 |
| 2002/0010071 A1 * | 1/2002 | Cohen ............................. 501/105 |

FOREIGN PATENT DOCUMENTS

| JP | 61-117153 | * | 6/1986 |
| JP | 9-207004 | * | 8/1997 |

* cited by examiner

Primary Examiner — Karl E Group
(74) Attorney, Agent, or Firm — Foley & Lardner LLP

(57) ABSTRACT

The invention provides a sintered, yttria stabilized zirconium-toughened alumina ceramic product comprising about 80-94 w/w % $Al_2O_3$, about 5-19 w/w % $ZrO_2$ and about 0.18-0.72 w/w % $Y_2O$.

5 Claims, 1 Drawing Sheet

(Prior Art)

ALUMINA CERAMIC PRODUCTS

RELATED APPLICATIONS

Figure 1:
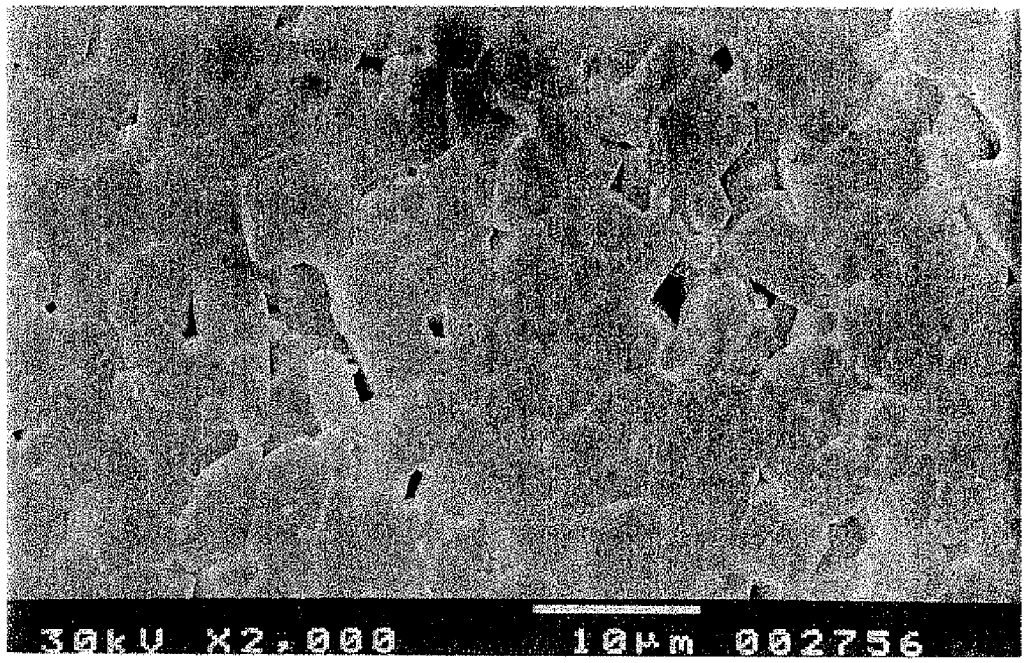

This application is a continuation of U.S. patent application Ser. No. 11/215,183 filed Aug. 29, 2005 now abandoned and claims the benefit of the filing date thereof.

The present invention relates to a sintered, alumina ceramic product. More particularly, the present invention relates to a sintered, alumina ceramic product exhibiting a high hardness and toughness said product being formed from yttria stabilized zirconium-toughened alumina.

As is known, and as is described e.g. in U.S. Pat. No. 6,624,106, the relevant teachings of which are incorporated herein by reference, the properties of ceramic pieces are in most cases non-uniform, i.e., the value of a property, for example hardness, varies from point to point of a specimen and even more so between different products produced in the same batch due to a variety of variables including stabilizing agents added to the product which influence phase-transformation and also grain growth during the sintering process.

These variations are due to variations in the phase composition, grain size, porosity and internal stress distribution of the products. This also leads to fluctuations in the fired-part density. The sintering process itself, even without temperature gradients is non-uniform also due to the aggregates present in the powder to be sintered. This may cause differences from point to point in the product itself and in the size and numbers of the residual pores which remain after sintering. In other cases rapid cooling may leave stresses which are not evenly distributed. Such stresses also influence properties such as strength and toughness.

Thus, e.g., at a conference organized for Apr. 30-May 3, 2000 at America's Center, St. Louis, Mo., Focused Session 6 was entitled: Point Defects, Transport, and other Defect-Related Phenomena in Ceramics", wherein the abstract describing said session stated that "Point defects occur in all ceramic materials, at larger defect concentrations to some extent bound in associates and clusters. Point defects are present within the bulk, at and near interfaces, however, not necessarily everywhere in equal concentrations. Many properties of ceramic materials and also processes involving such materials are strongly influenced by point defects. Therefore, detailed experimental and/or theoretical studies of point defects in ceramics and of related phenomena can significantly contribute to improve the current understanding of defect-related properties of ceramics and of many processes involving such materials."

This problem is especially acute when alumina pellets are used in ceramic shock-absorbing panels, since non-uniformity of toughness and shock-absorbing capability of adjacent pellets can have adverse effect on the reliability of the panel produced therefrom.

With this state of the art in mind, U.S. Pat. No. 6,624,106 described and taught that by combining aluminum oxide with other oxides within specific parameter ratios, there is achieved an exceptional rise in the homogeneity of the produced product in terms of parametric tolerance based on crush point studies of geometric bodies produced therefrom after sintering. Thus, it was found and described therein that by using raw materials in which the chemical compositions fall within a specific range and forming them into geometric sintered shapes, homogeneity of performance previously unknown in the art and quantitatively and qualitatively superior to that of products presently available on the market is achieved.

While the ceramic products produced according to said patent proved to be superior to other similar ceramics, it has now been discovered according to the present invention that whereas in the past MgO has been used to successfully stabilize the phase transfer process of zirconium-toughened alumina, that yttria, when added to the zirconia in place of the MgO significantly improves the strength, toughness, homogeneity and grain size uniformity of the ceramic body produced therefrom.

Thus according to the present invention there is now provided a sintered, yttria stabilized zirconium-toughened alumina ceramic product comprising about 80-94 w/w % $Al_2O_3$, about 5-19 w/w % $ZrO_2$ and about 0.18-0.72 W/W % $Y_2O$.

In a first preferred embodiment of the present invention there is provided a sintered, yttria stabilized zirconium-toughened alumina ceramic product comprising about 80 w/w % $Al_2O_3$, about 19 w/w % $ZrO_2$ and about 0.72 w/w % $Y_2O$.

In a further preferred embodiment of the present invention there is provided a sintered, yttria stabilized zirconium-toughened alumina ceramic product comprising about 94 w/w % $Al_2O_3$, about 5 w/w % $ZrO_2$ and about 0.18 w/w % $Y_2O$.

In a yet further preferred embodiment of the present invention there is provided a sintered, yttria stabilized zirconium-toughened alumina ceramic product comprising about 91 w/w % $Al_2O_3$, about 9.5 w/w % $ZrO_2$ and about 0.3 w/w % $Y_2O$.

In an especially preferred embodiment of the present invention there is provided a sintered, yttria stabilized zirconium-toughened alumina ceramic product comprising about 88 w/w % $Al_2O_3$, about 11 w/w % $ZrO_2$ and about 0.4 w/w % $Y_2O$.

The ceramic products of the present invention can preferably include further minor amounts of additional oxides, selected from the group consisting of $Na_2O$, $P_2O_5$, $K_2O$, $CaO$, $TiO_2$, $Fe_2O_3$, $CuO$, $ZnO$ and $BaO$ and mixtures thereof.

The present invention also provides a ceramic pellet for use in a shock-absorbing panel, said pellet being made from a sintered, yttria stabilized zirconium-toughened alumina ceramic product comprising about 80-94 w/w % $Al_2O_3$, about 5-19 w/w % $ZrO_2$ and about 0.18-0.72 w/w % $Y_2O$.

In especially preferred embodiments of the present invention there is provided a shock-absorbing panel comprising a single internal layer of high density ceramic pellets which are directly bound and retained in plate form by a solidified material such that the pellets are arranged in a single layer of adjacent rows and columns wherein a majority of each of said pellets is in direct contact with at least four adjacent pellets, wherein each of said pellets is made from a sintered, yttria stabilized zirconium-toughened alumina ceramic product comprising about 80-94 w/w % $Al_2O_3$, about 5-19 w/w % $ZrO_2$ and about 0.18-0.72 w/w % $Y_2O$.

The surprising homogeneity and uniformity of the ceramic products according to the present invention enables the use thereof in electrically related applications.

Thus, the present invention also provides a ceramic product, as hereinbefore defined, wherein the bulk resistivity of a plurality of products prepared from the same batch exhibits a standard deviation of less than 0.1.

As stated the ceramic material of the present invention comprises, a zirconia-alumina composition in which the zirconia is stabilized with yttria. As a result the ceramic material will produce a ceramic body which is less susceptible to the formation of macro-cracks thereby improving the toughness and hardness of the ceramic body thus formed from this composition. The yttria stabilized zirconia in the compositions of the present invention has been found to provide for improved control of grain size and grain size uniformity and is especially suitable for transformation toughening which results in a combination of high strength together with high fracture toughness.

During the sintering process of $Al_2O_3$—$ZrO_2(Y_2O_3)$, the zirconia will undergo a phase transformation process when combined with yttria resulting in a stabilized zirconia which is in a tetragonal/cubic form. The tetragonal/cubic phase necessarily undergoes diffusionless transformation to the tetragonal phase during cooling. The ceramic material is held in the F+T phase field until the yttria is distributed into the equilibrium concentrations required to form the stable tetragonal and cubic phases of the material. This zirconia is termed as stabilized and when sintered together with alumina will produce a media that has increased hardness, toughness and a high thermal shock resistivity.

In addition to this, grain growth during sintering is controlled in, monoclinic powder coated with yttria. Other trace elements in the composition can include but are not limited to Cl, CaO, $TiO_2$, $Ga_2O_3$ and $HfO_2$.

While the invention will now be described in connection with certain preferred embodiments in the following examples and with reference to the accompanying figure so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

Figure 2:
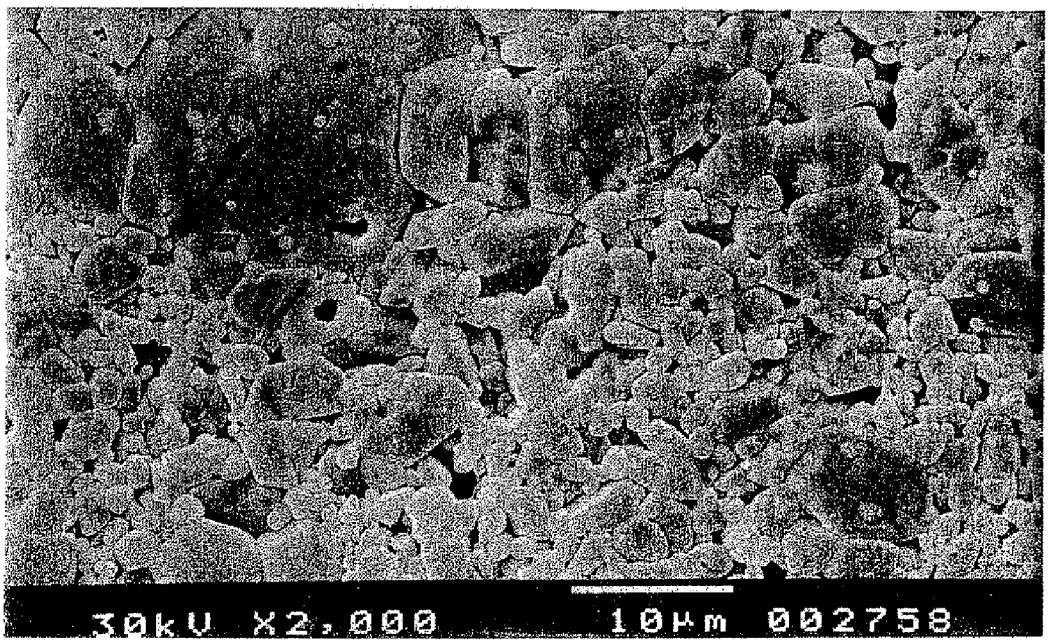

In the drawings:

FIG. 1 is a photograph of a microscopic view of the structure of a ceramic material prepared according to the present invention, and FIG. 2 is a photograph of microscopic view of the structure of a ceramic material prepared according to the prior art, the composition of which is discussed in the examples hereinafter.

EXAMPLE 1

A plurality of ceramic bodies were prepared from $Al_2O_3$ ceramic powder ground to a size of about 180-200 microns and having compositions as defined in the following table:

| Composition | A | B |
|---|---|---|
| $Al_2O_3$ | 91.0 | 89.9 |
| $Z_rO_2$ | 9.5 | 9.0 |
| $Y_2O_3$ | 0.3 | — |
| MgO | 0.04 | 0.24 |
| CaO | 0.06 | 0.22 |
| Total | 100.9 | 99.8 |

The ground powder, after cleaning, was pressed in a suitable mold using special Tungsten Carbide tooling, having a pressure of 70 tons for about two seconds, to form ceramic bodies of different preferred dimensions, all of said bodies being of cylindrical shape with two convexly-curved end faces and having varying diameters. The bodies which are formed were then placed in a tray for transfer to a sintering oven. The bodies were then sintered at a temperature of 1,700° C. for seventy-two hours, after which the sintered shapes are removed from the sinter oven and allowed to cool at room temperature.

As seen from the table above, cylinders of group A are according to the present invention and were prepared with a 30 mm diameter size, and cylinders of group B are according to the prior art and were prepared with a diameter of 30 mm.

The characteristics that were tested for each of the cylinders were:
1. Density (BD) and Porosity (OP),
2. Hardness ($H_V$)
3. Toughness ($K_{IC}$)
4. Grain Size Split ($X_m$, $X_M$, X)
5. Chemical Analysis (EMPA)

With regard to particle size distribution, the average size (X), minimum size ($X_m$) and maximum size $X_M$ of the grains were measured using the lineal intercept method.

For the purposes of comparing the grain size, thermal etching was done. A first attempt at 1,450° C. (which gives good results in the case of pure alumina) failed.

The second thermal etching at 1,500° C. succeeded in exposing the grain limits in all their details.

The etching was done on polished samples at the level of hardness degree and after etching the samples were filmed by SEM (using Model 5000 JSM form the JEOL company), at various points on the polished surface.

The grain size was determined by these photographs and FIGS. 1 and 2 show the microstructure of the ceramic material of group A and group B respectively.

The chemical analysis of the various structures was done using two methods, i.e. wet chemical analysis and electron microprobe analysis (EMPA) as set forth in table 1 hereinbefore.

Table 2 hereinafter shows the results of measuring $X_m$, $X_M$, X of the three sample groups wherein the results indicate that the microstructures of the different groups are similar but not identical.

| Group | X μm | $X_M$ μm | $X_m$ μm |
|---|---|---|---|
| A | 2.84 | 12.5 | 0.65 |
| B | 2.40 | 16.0 | 0.42 |

The distribution of particle size of each of the two compositions was further measured and determined using the weighted average method and using this method it was found that ceramic material A was composed of 24% particles in the range of 5-12μ, 28% particles in the range of 1.8-4.5μ, and 48% particles in the range of 0.3-1.25μ, while that of ceramic material B was composed of 10% particles in the range of 5-13μ, 35% particles in the range of 1.8-4.5μ, and 55% particles in the range of 0.3-1.25μ. Thus the weighted average of particle size for ceramic material A was about 3.3μ, while the weighted average of particle size for ceramic material B was about 2.43μ.

As can be seen both from table 2 and from the figures attached hereto and the above calculations, ceramic material prepared according to the present invention with the addition of yttria oxide is characterized by grains of larger size and greater uniformity which results in the ceramic material prepared therefrom having superior toughness and especially fracture toughness which is a quantitative way of expressing a material's resistance to brittle fracture when a crack is present. Thus the fracture toughness of a material is characterized by the energy per unit area which is required to create new crack surfaces and thereby propagate a crack through the material. This value is also known as the critical stress intensity factor and is determined at the time of crack extension. The Mode I fracture toughness or $K_{IC}$ of a material usually depends on the orientation and direction of propagation of the crack in relation to the anisotropy of the material and depends in turn on the principle directions of mechanical working or grain flow.

In table 3 hereinafter there is now provided the measured $K_{IC}$ of the ceramic materials of groups A and B.

| Parameter | A | B |
|---|---|---|
| $K_{IC}$ (Mpam$^{1/x}$) | 6.3 | 5.5 |
|  | 6.6 | 6.1 |
|  | 6.4 | 5.9 |
| $K_{IC}$ (Group) | 6.4 | 5.8 |
| Standard Variation | 0.2 | 0.3 |
| % Variation from Standard | 2 | 5 |

As will be noted the average toughness for three measured samples of group A ceramic materials was 6.4, while the average toughness for three measured samples of group B ceramic materials was only 5.8, which is a significant improvement.

In order to better demonstrate the significance of said difference, a plurality of ceramic bodies of substantially cylindrical shape and having a convexly curved end face with the same radius of curvature were prepared, and then 10 cylinders of group B having a diameter of 28 mm. and a height of 23.5 mm. and 37 cylinders of group A having a diameter of 28 mm. and a height of 22.5 mm. were each placed in a hydraulic press Model M.50/1 manufactured by Taamal Mizra, Kibbutz Mizra, Israel, incorporating a C-57-G piston and capable of generating 50 tons of pressure. The shattering point of each body was recorded as follows:

| | Cylinders of group B, D of 28, H of 23.5 | Cylinders of group A, D or 28, H of 22.5 |
|---|---|---|
| 1 | 24.4 | 23.06 |
| 2 | 16 | 23.55 |
| 3 | 24.8 | 21.66 |
| 4 | 18.2 | 21.57 |
| 5 | 24.4 | 20.5 |
| 6 | 20.3 | 23.7 |
| 7 | 23.3 | 21.8 |
| 8 | 24 | 23.6 |
| 9 | 20 | 22.1 |
| 10 | 23 | 22.7 |
| 11 |  | 24.6 |
| 12 |  | 23.6 |
| 13 |  | 22.8 |
| 14 |  | 23.3 |
| 15 |  | 24.8 |
| 16 |  | 24 |
| 17 |  | 24.5 |
| 18 |  | 22.6 |
| 19 |  | 24.6 |
| 20 |  | 23.3 |
| 21 |  | 22.5 |
| 22 |  | 24.1 |
| 23 |  | 20.6 |
| 24 |  | 23.9 |
| 25 |  | 27 |
| 26 |  | 23 |
| 27 |  | 25.7 |
| 28 |  | 26 |
| 29 |  | 23.1 |
| 30 |  | 22.4 |
| 31 |  | 24.6 |
| 32 |  | 24.3 |
| 33 |  | 23.2 |
| 34 |  | 20.2 |
| 35 |  | 23.8 |
| 36 |  | 22.5 |
| 37 |  | 22.7 |
| Ave. | 21.84 | 23.31027027 |
| Min. | 16 | 20.2 |
| Max. | 24.8 | 27 |
| STV | 3.039078808 | 1.458034229 |

As will be noted, even though the cylinders of group B had a height which was greater than that of the cylinders of group A and would therefore be expected to have a higher shattering point in fact the cylinders of group B composition had an average shattering point of 21.84 tons while the cylinders to group A composition according to the present invention had an average shattering point of 23.3 tons.

It will be evident to those skilled in the art that the invention is not limited to the details of the foregoing illustrative examples and that the present invention may be embodied in other specific forms without departing from the essential attributes thereof and it is therefore desired that the present embodiments and examples be considered in all respects as illustrative and not restrictive, reference being made to the appended claims, rather than to the foregoing description, and all changes which come within the meaning and range of equivalency of the claims are therefore intended to be embraced therein.

What is claimed is:

1. A panel comprising a single internal layer of a plurality of high-density ceramic pellets each having a convexly curved end face which are directly bound and retained in plate form by a solidified material such that the pellets are arranged in a single layer of adjacent rows and columns with the convexly curved end faces oriented in the same direction wherein a majority of each of said pellets is in direct contact with at least four adjacent pellets, said panel being an armor panel exhibiting high fracture toughness and shock absorbing property, wherein each of said pellets is made from yttria stabilized zirconium-toughened alumina ceramic product sintered at 1700° C. and comprises about 80-94 w/w % $Al_2O_3$, about 5-19 w/w % $ZrO_2$ and about 0.18-0.72 W/W % $Y_2O$; and wherein the yttria stabilized zirconium-toughened alumina ceramic product further comprises additional oxides selected from the group consisting of $Na_2O$, $P_2O_5$, $K_2O$, CaO, $TiO_2$, $Fe_2O_3$, CuO, ZnO, BaO and mixtures thereof.

2. The panel according to claim 1, wherein the yttria stabilized zirconium-toughened alumina ceramic product comprises about 80 w/w % $Al_2O_3$, about 19 w/w % $ZrO_2$ and about 0.72 W/W % $Y_2O$.

3. The panel according to claim 1, wherein the yittria stabilized zirconium-toughened alumina ceramic product comprises about 94 w/w % $Al_2O_3$, about 5 w/w % $ZrO_2$ and about 0.18 W/W % $Y_2O$.

4. The panel according to claim 1, wherein the yittria stabilized zirconium-toughened alumina ceramic product comprises about 88 w/w % $Al_2O_3$, about 11 w/w % $ZrO_2$ and about 0.4 W/W % $Y_2O$.

5. The panel according to claim 1, wherein the bulk resistivity of a plurality of panels prepared from the same batch of yittria stabilized zirconium-toughened alumina ceramic product exhibits a standard deviation of less than 0.1.

* * * * *